US007102782B2

(12) United States Patent
Nagaoka

(10) Patent No.: US 7,102,782 B2
(45) Date of Patent: Sep. 5, 2006

(54) IMAGE FORMING APPARATUS AND IMAGE FORMING METHOD

(75) Inventor: Yasuhiro Nagaoka, Mishima (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 812 days.

(21) Appl. No.: 10/206,942

(22) Filed: Jul. 30, 2002

(65) Prior Publication Data

US 2004/0021887 A1    Feb. 5, 2004

(51) Int. Cl.
    *G06F 15/00* (2006.01)
    *G03G 15/00* (2006.01)
(52) U.S. Cl. .................... 358/1.15; 399/82
(58) Field of Classification Search ........... 358/1.15, 358/1.14, 1.18, 1.1, 1.16; 399/407, 82, 50, 399/24; 370/412, 907, 252; 705/400, 7, 705/26, 39; 426/383, 392; 400/265
    See application file for complete search history.

(56) References Cited

U.S. PATENT DOCUMENTS 5,435,544 A * 7/1995 Mandel ................. 271/298
5,815,764 A * 9/1998 Tomory .................. 399/1
5,898,592 A * 4/1999 Salgado et al. ......... 700/214

FOREIGN PATENT DOCUMENTS

JP       2000-32201       1/2000

* cited by examiner

*Primary Examiner*—Mark Wallerson
*Assistant Examiner*—Saeid Ebrahimi-Dehkordy
(74) *Attorney, Agent, or Firm*—Foley & Lardner LLP

(57) ABSTRACT

A multi-functional peripheral is configured to, when fax data is received from a PC, store the received fax data, notify receipt of the fax data to a distinction PC and, when a divisional control code is input, print out the fax data stored in accordance with an operation.

5 Claims, 5 Drawing Sheets

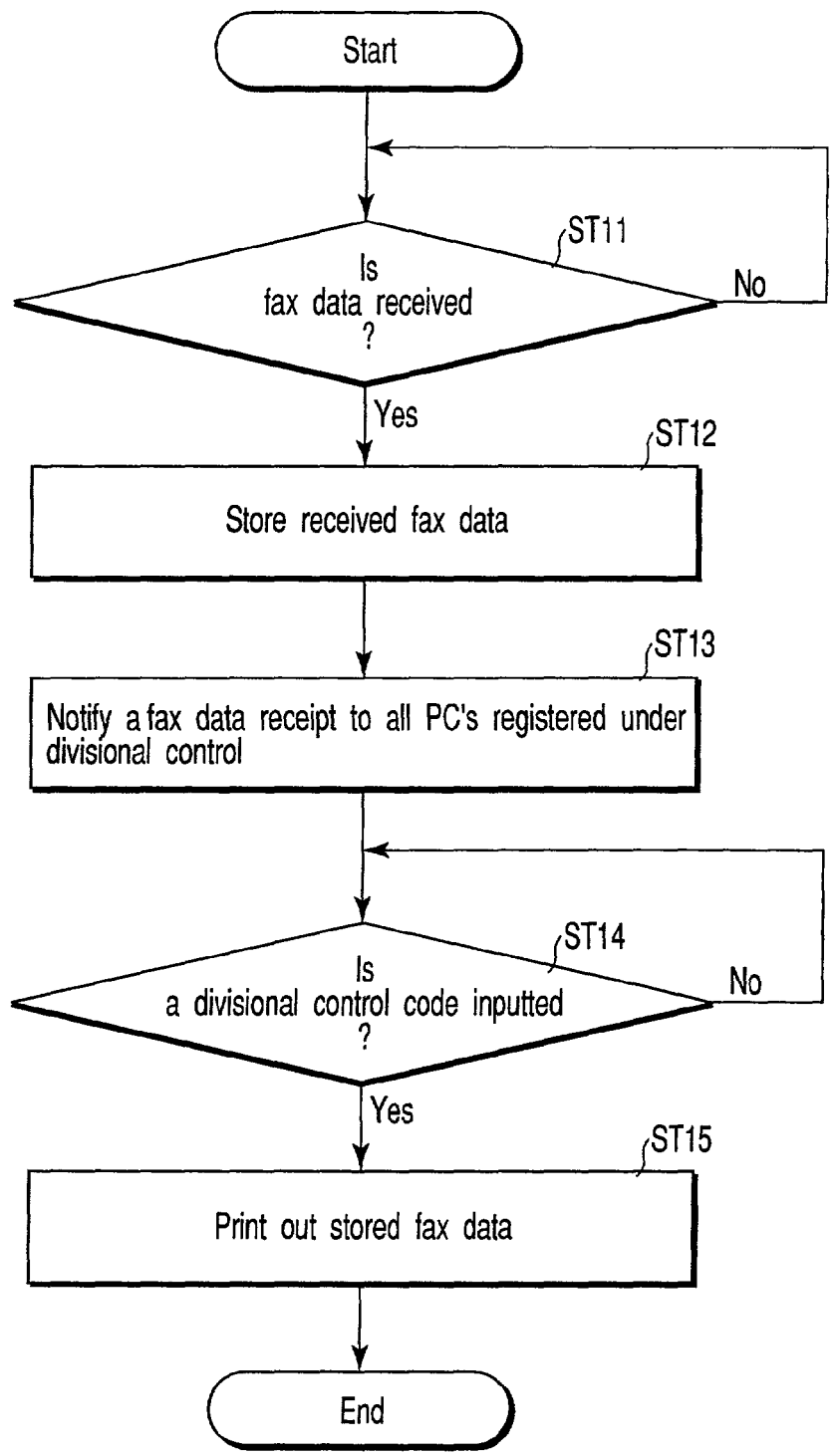
F I G. 6

IMAGE FORMING APPARATUS AND IMAGE FORMING METHOD

BACKGROUND OF THE INVENTION

The present invention relates to an image forming method and an image forming apparatus which, for example, form an image based on input data via a communication circuit line.

Conventionally, for a facsimile communication between a plurality of personal computers (PCs) connected to a multi-functional peripheral it is possible to, under the function of a divisional control, designate a communication destination and effect security control of fax data printed out on the multi-functional peripheral (hereinafter referred to an MFP).

In the case where the divisional control is set, it is not possible to operate the MFP unless any registered divisional control code is input. If, therefore, no divisional control code is input, it is not possible to print out data which is fax-transmitted to the MFP and it is possible to assure security.

It is to be noted that the registration information of the divisional control code is not publicly disclosed on the display, etc., of an operation panel.

Further it is possible to reset the registration of a registered divisional control code by the clearing of RAM in the apparatus involved.

In the case where, however, a fax is transmitted from the registered PC to the MFP, the fax data is received on the MFP. On the PC side receiving a print-output of the fax data involved, however, it is not possible to know that the fax data has been transmitted to the MFP.

After the transmitting of the fax, therefore, this effect has been notified by telephone for example. By doing so, the fax receiving person (destination) inputs the divisional control code to the MFP involved and receives the fax data from the MFP as a print-out.

It is, therefore, very difficult to perceive the fax receiving information on a disk such as when, from whom and from where it is received. Thus a problem is involved.

BRIEF SUMMARY OF THE INVENTION

It is accordingly the object of the present invention to provide an image forming apparatus and an image forming method which can form an image through easy access of data receipt information.

In one aspect of the present invention there is provided an image forming apparatus for forming an image based on data input via a communication circuit line, comprising a registering section configured to register a personal computer connected via the communication circuit line and share a registered code between registered personal computers; a receiving section configured to receive data at the personal computer registered with a destination transmitted via the communication circuit line from the personal computer registered on the registering section; a memory section configured to store the data received at a receiving section; a notifying section configured to notify information to the registered personal computer which is a destination of the data, the information being to the effect that the data has been received on the data receiving section; and a control section configured to control the formation of an image based on the data stored in the image section when the registered code is input.

In another aspect of the present invention, there is provided an image forming method for forming an image based on data input via a communication circuit line, comprising a step of registering a personal computer connected via the communication circuit line and sharing a registered code between registered personal computers; a step of receiving and storing data at the personal computer registered with a destination sent via the communication circuit from the registered personal computer; a step of notifying information to the registered personal computer which is a destination of the data, the information being to the effect that the data has been received; and a step of controlling the formation of the image based on the stored data when the registered code is input.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a flowchart for explaining operation of a second embodiment.

DETAILED DESCRIPTION OF THE INVENTION

With reference to the drawings, an explanation will be made below about the first embodiment of the present invention.

Figure 1:
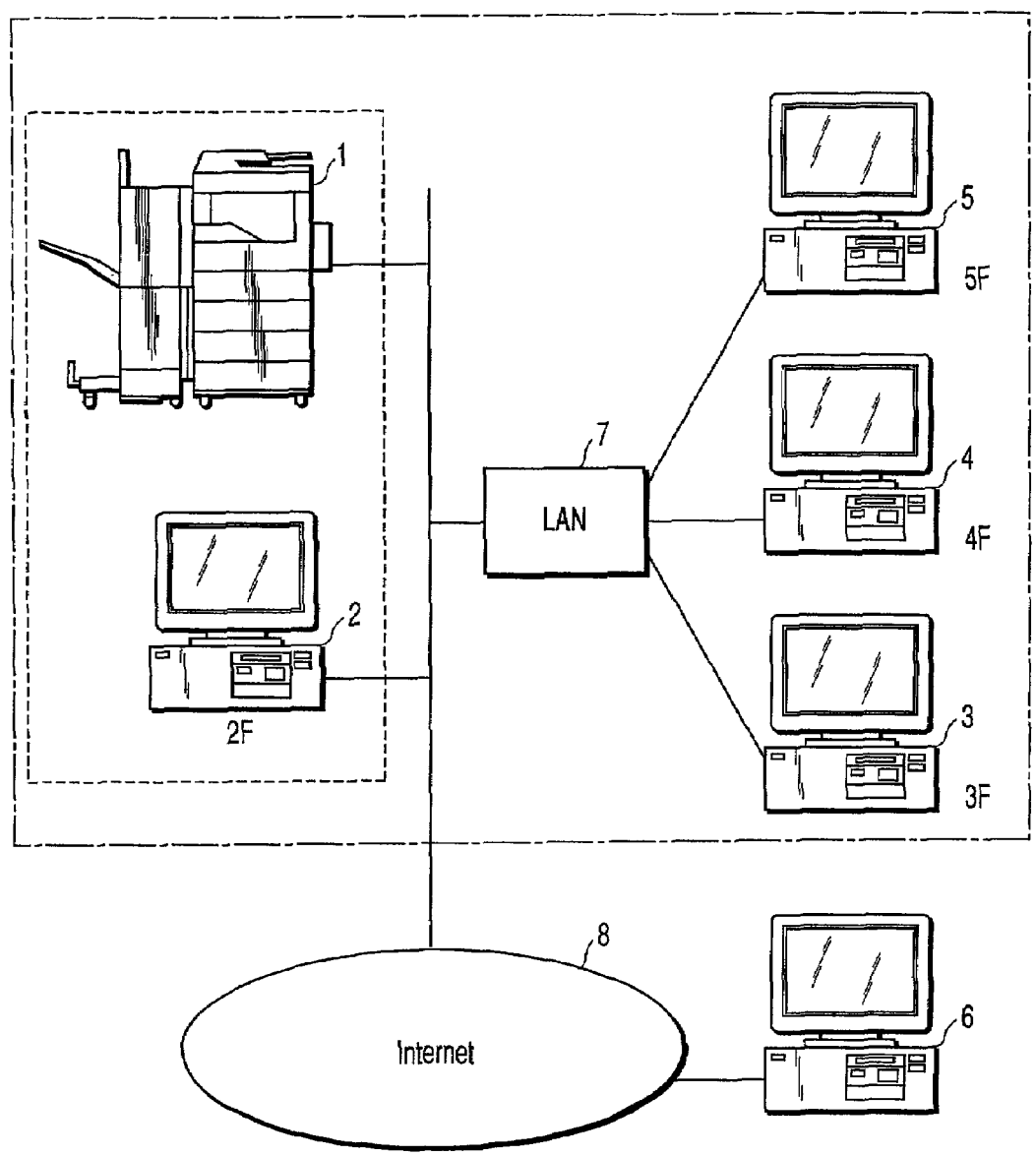
FIG. 1 is a view showing a schematic structure of a multi-functional peripheral, and its system, according to an image forming apparatus of the present invention.

FIG. 1 is a schematic view showing a multi-functional peripheral (hereinafter referred to as an MFP) 1 and its system.

The present system is connected to the MFP 1 and comprises personal computers (hereinafter referred to as PCs) 2, 3, 4, 5, and 6 under divisional control.

The PC 2 is connected directly to and near the MFP 1 and placed on a second floor which is the same floor on which the MFP 1 is placed.

The PC 3 is connected through a LAN 7 to the MFP 1 and placed on a third floor in the same building.

The PC 4 is connected through the LAN 7 to the MFP 1 and placed on a fourth floor in the same building.

The PC 5 is connected through the LAN 7 to the MFP 1 and placed on the fifth floor in the same building.

The PC 6 is connected through the Internet 8 to the MFP 1.

Figure 2:
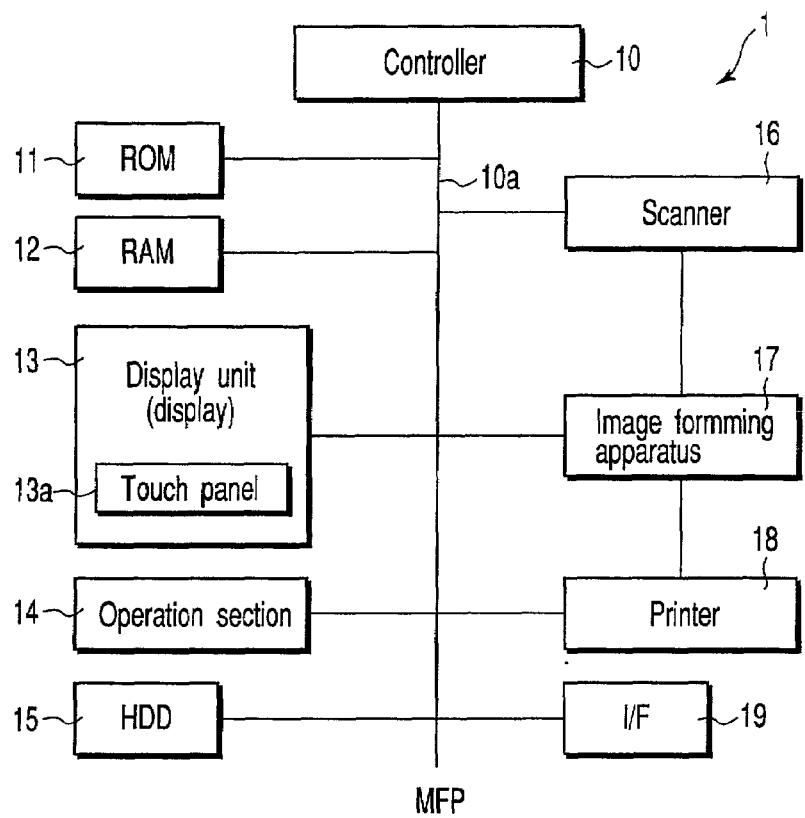
FIG. 2 is a block diagram showing a schematic arrangement of a multi-functional peripheral.

FIG. 2 shows a schematic arrangement of the MFP 1.

As shown in FIG. 2, the MFP 1 has a controller 10, a ROM 11, a RAM 12, a display unit (display) 13, an operation section 14, a hard disk drive (HDD) 15, a scanner 16, an image processing section 17, a printer 18 and an interface (I/F) 19, etc.

With the controller 10 as a center, these constituent elements are connected to the controller 10 via a bus 10a.

As the controller use is made of a CPU. This controller 10 controls the whole operation of the MFP 1 and is operated under a program which is initially stored in the ROM 11.

The RAM 12 stores fax data, text data, image data, etc., or various kinds of information.

The display unit 13 comprises a liquid crystal device with a touch panel 13a built therein. The operation section 14 comprises hard keys, such as numeric keys, a cursor key and a copy start key. Various kinds of operation are performed on the MFP 1 by means of the hard keys on the operation section and touch panel 13a.

The HDD 15 stores the fax data, the text data and the image data, etc., or the various kinds of information.

The scanner 16 is configured to optically scan a document and converts the document to image data. The image processing section 17 applies various kinds of processing to the image data. The printer prints the fax data, the text data, image data, etc., on paper sheets. As the printer, various types are considered such as an electrophotographic type and ink jet type and, in the embodiment of the present invention, it is assumed that the electrophotographic type is used.

The interface (I/F) 19 is used for connection to the PC 1, the LAN 7 and the Internet 8.

Figure 3:
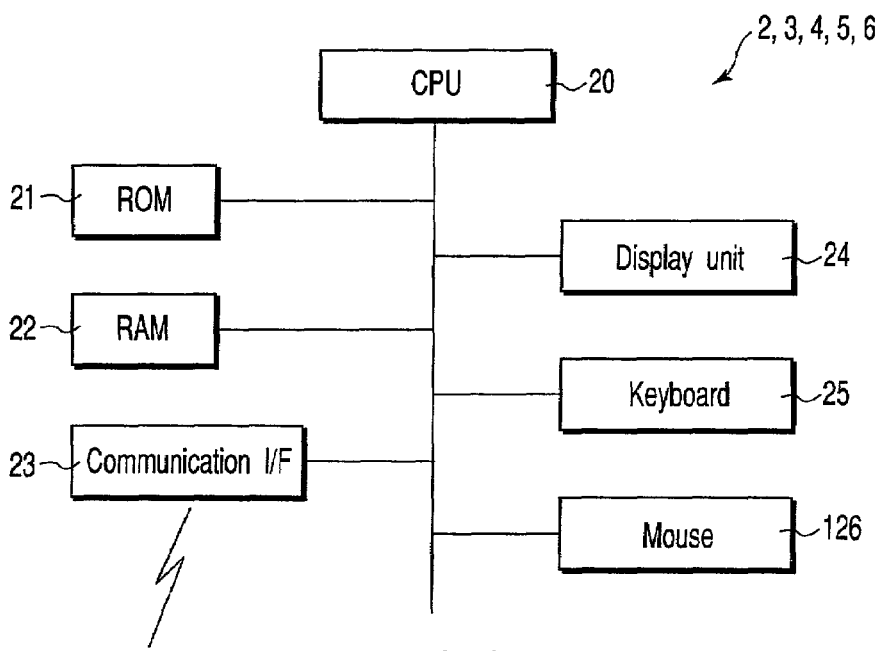
FIG. 3 is a view showing a schematic arrangement of a personal computer.

FIG. 3 shows a schematic arrangement of the PCs 2, 3, 4, 5, and 6. The personal computer (PCs 2, 3, 4, 5, 6) comprises a CPU 20 for controlling a whole unit, a ROM 21 for storing analytic software, a control program, etc., a RAM 22 for temporarily storing data, a communication interface (I/F) 23 for conducting communication with an external device (PC, MFP, etc.), a display unit 24 for displaying various kinds of information, a keyboard 25 serving as an input section, and a mouse 26.

The summary of the present invention will be explained below in connection with such arrangement.

In the MFP 1 of the present invention, the PCs 2 to 6 are registered under divisional control with their ID attached thereto. And the MFP 1 is set in a standby state for receiving the ID of the PC registered under the divisional control.

When, in the first embodiment, fax data is transmitted from the PC (2 to 6) registered under the divisional control, the MFP 1 stores the received fax data in the RAM 1 or the HDD 15 and notifies the fax data receipt destination (destination PC) that the fax data has been received.

In the MFP 1, a program corresponding to such an operation is initially stored in the ROM 11.

The notified PC user acknowledges the received notice on the display as a pop-up or, in a currently receiving state, acknowledges a receipt situation on an individual application (active dialog such as a printer window). When the user clicks a receipt acknowledge button of the receipt acknowledge dialog, a receipt acknowledge registered under the divisional control is ended relative to the MFP 1.

The program corresponding to such an operation is initially stored in the ROM 21 in the PCs 2 to 6.

After this, the PC user involved inputs a divisional control code from the operation section 14 to the MFP 1 and prints out the fax data which is stored in the RAM 12 or HDD 15 in the MFP 1. It is to be noted that the MFP 1 under the divisional control is not operated unless the divisional control code is input.

When, in the second embodiment, the fax data is transmitted from the PC (2 to 6) registered under the divisional control, the MFP 1 stores the received fax data in the RAM 12 or HDD 15 and notifies all the other PCs (2 to 6) that the fax data has been received.

Figure 4:
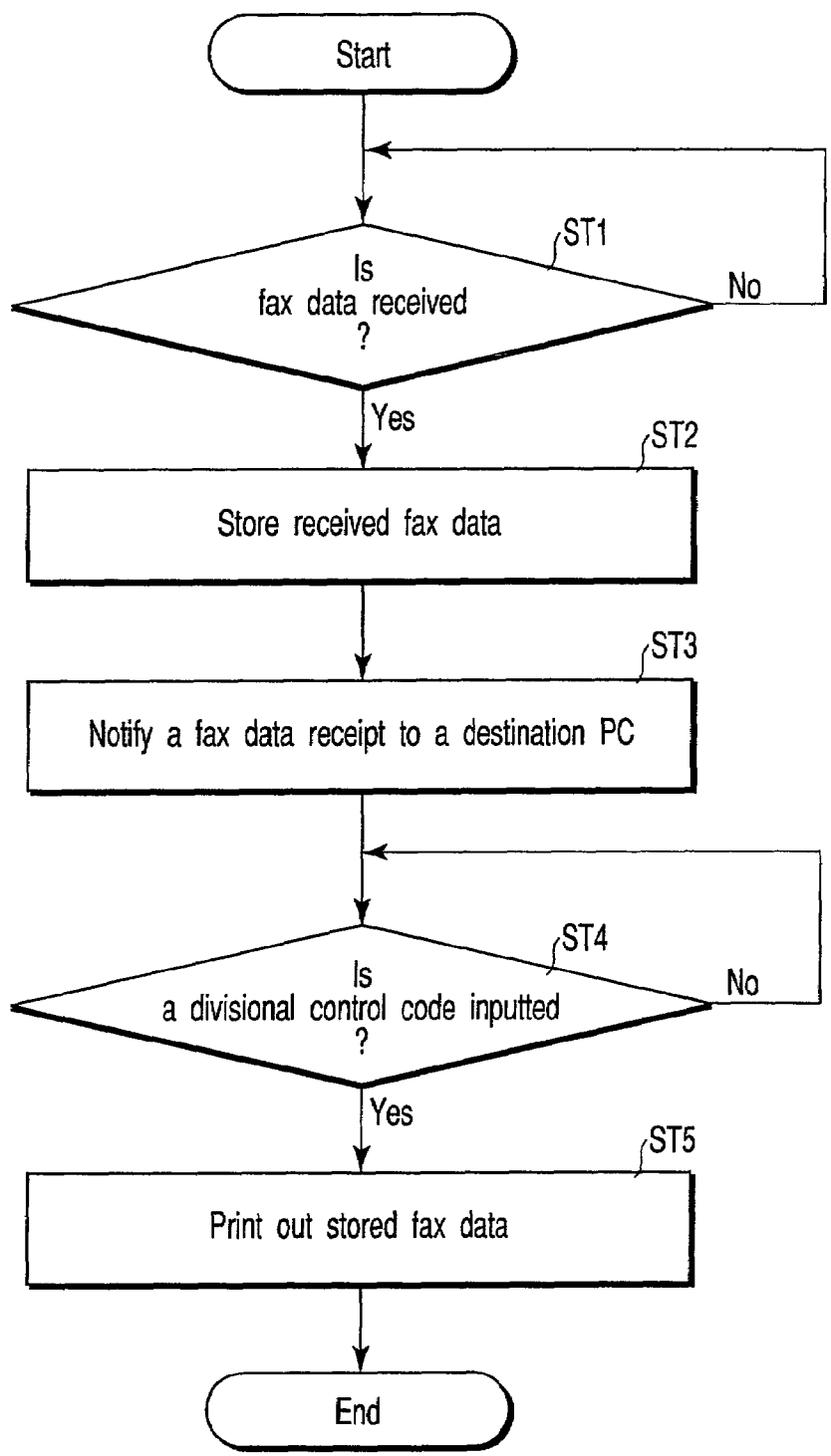
FIG. 4 shows a flowchart for explaining operation of a first embodiment.

Now the operation of the first embodiment will be explained below with reference to a flowchart shown in FIG. 4.

First, it is assumed that the PCs 2 to 6 are started up and the application is in a waiting state. It is also assumed that the MFP 1 is also started up.

When the controller 10 of the MFP 1 receives, for example, fax data from the PC 3 through the LAN 7 at the interface (receiving section) 19—(ST 1), the fax data is stored in the RAM 12 or HDD 15 as a memory section (ST 2).

Then the controller 10 as a notifying section notifies the receipt of the fax data to the destination PC of the received fax data (ST 3). If, for example, the destination is to the PC 2, the receipt of the fax data is notified as a pop-up on the display unit 24 of the PC 2.

Figure 5:
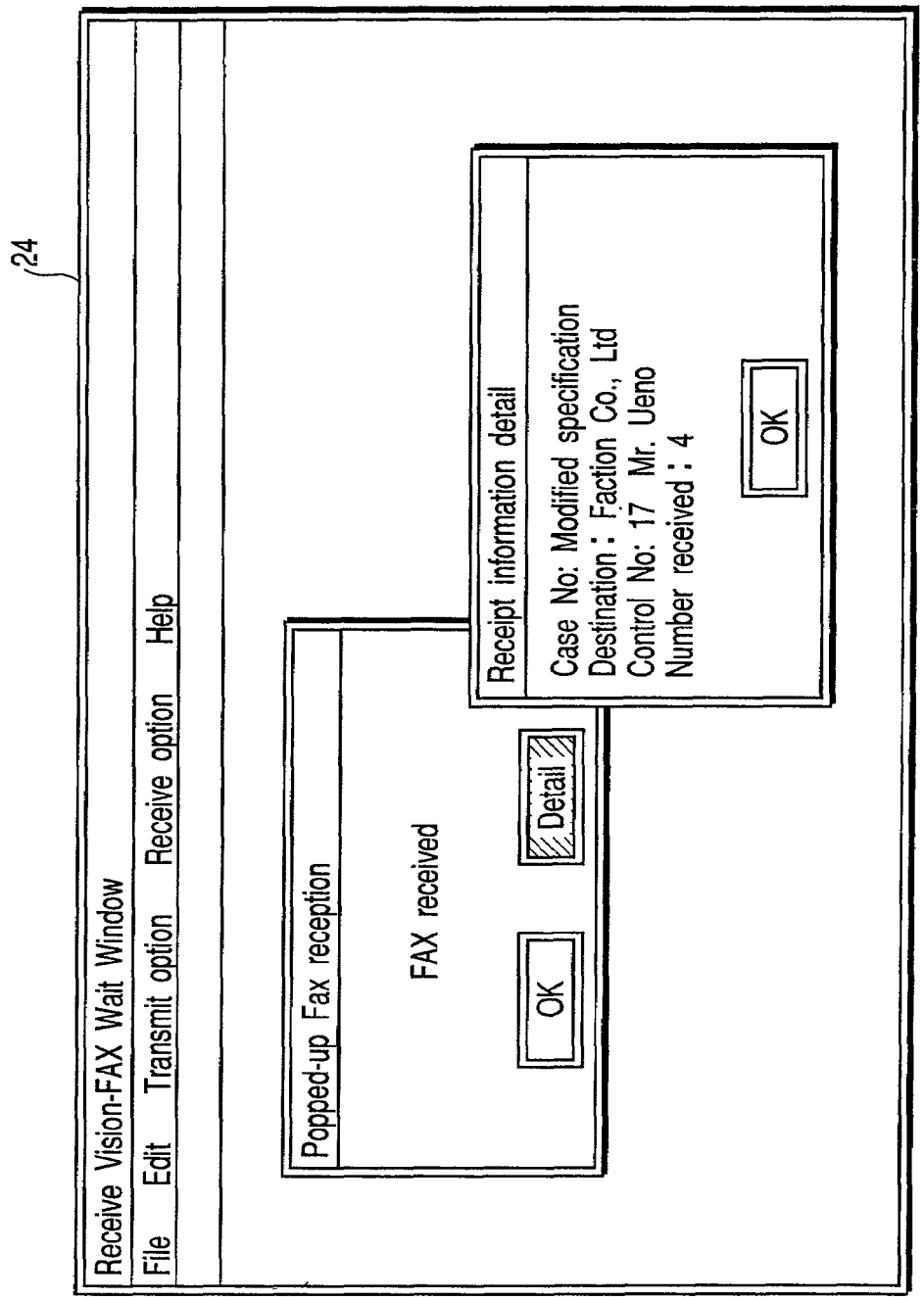
FIG. 5 is a view showing one form of a notice which is received as fax data.

FIG. 5 shows one form of a fax receipt notice displayed on the display unit of the personal computer (PC). The notice "Fax data (FAX) received" is displayed as "a pop-up fax (FAX) receipt" and, in addition, an OK key and detail key are also displayed.

When the detail key is clicked, the CPU 20 displays "receipt information detail" on the display unit 24.

The receipt information detail shown in FIG. 5 displays "Case No: Modified Specification", "Destination: Function Co., Ltd", "Control No: 17 Mr. Ueno", "Number Received: 4" and "OK key".

The PC 2 user inputs the divisional control code from the operation section 14 of the MFP 1 (ST 4) and the fax data stored in the RAM 12 of the MFP 1 is printed out (ST 5).

Although, here, the divisional control code is used, the MFP 1 may transmit a specified code number upon notification and print out the fax data stored only when the code number is inputted.

Then the operation of the second embodiment will be explained below with reference to a flowchart shown in FIG. 6.

First, it is assumed that the PCs 2 to 6 are started up and the application is in the waiting state. It is also assumed that the MFP 1 is started up.

When the controller 10 of the MFP 1 receives, for example, fax data from the PC 6 via the Internet 8 (ST 11), the received fax data is stored in the RAM 12 or HDD 15 (ST 12).

Then, the controller 10 notifies a fax data receipt to all the PCs (2 to 6) registered under the divisional control (ST 13). In this case, since the transmitting destination is to the PC 6, the fax data receipt is notified as a pop-up to the display unit 24 of the PCs 2, 3, 4, and 5.

There, the user of the respective PC (2 to 5) inputs the divisional control code from the operation section 14 of the MFP 1 as required (ST 14) and prints out the fax data stored in the RAM 12 of the MFP 1 (ST 15).

Although, in the above-mentioned embodiment, a multifunctional peripheral (MFP) is explained, it may be possible to use fax equipment.

According to the embodiment of the present invention, as set out above, the information (data) can be obtained in realtime relative to frequent transactions by clients registered under the divisional control and it is, therefore, possible to smoothly perform the operation.

Further, since the data under the divisional control can be transmitted and received under a security environment, it is possible to safely and speedily share the information (data) among the clients for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus for forming an image based on data input via a communication circuit line, comprising:
   a registering section configured to attach and register a divisional control code to each ID of a plurality of personal computers included in one division when controlling the plurality of personal computers connected via the communication circuit line as one division;
   a receiving section configured to receive data sent via the communication circuit line from a personal computer registered in the registering section;
   a memory section configured to store the data received at the receiving section by associating the received data with the divisional control code attached to the ID of the personal computer;
   a notifying section configured to notify information to all the personal computers, registered in the registering section, to which the divisional control code has been attached, the information being to the effect that the data has been received at the receiving section; and
   a control section configured to control the formation of an image based on the data stored in the memory section and associated to the divisional control code when the divisional control code is input.

2. An image forming apparatus according to claim 1, wherein the receiving section is configured to receive only the data sent from the personal computer registered in the registering section.

3. An image forming apparatus according to claim 1, wherein the memory section comprises a RAM or a hard disk.

4. An image forming apparatus according to claim 1, wherein the notifying section is configured to notify information on the receipt data including a case number, a destination, a control number, and number of receipt sheets.

5. An image forming method for forming an image based on data input via a communication circuit line comprising:
   attaching and registering a divisional control code to each ID of a plurality of personal computers included in one division when controlling the plurality of personal computers connected via the communication circuit line as one division;
   receiving data sent via the communication circuit line from a registered personal computer;
   storing the received data by associating the data with the divisional control code attached to the ID of the personal computer;
   informing information to all the personal computers, registered in the registering section, to which the divisional control code has been attached, the information being to the effect that the data has been received; and
   controlling the formation of the image based on the stored data associated to the divisional control code when the divisional control code is input.

* * * * *